May 26, 1953 — J. A. STREUN — 2,639,468
COTTON CLEANER
Filed Aug. 11, 1950 — 3 Sheets-Sheet 3
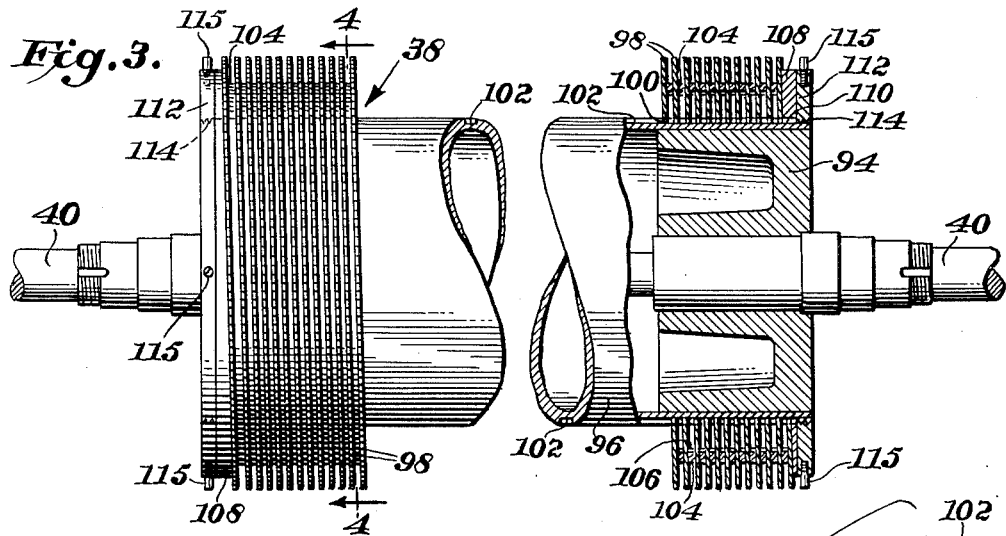
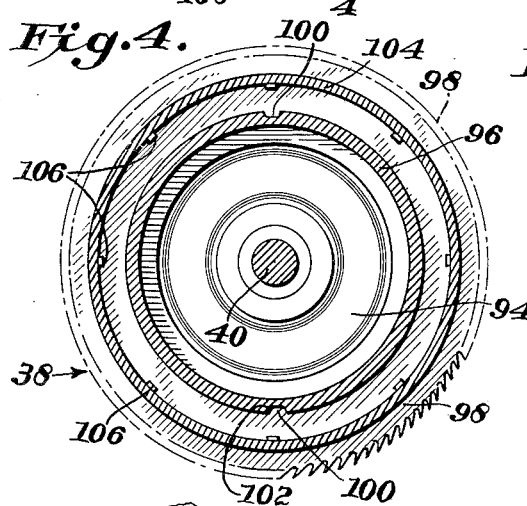
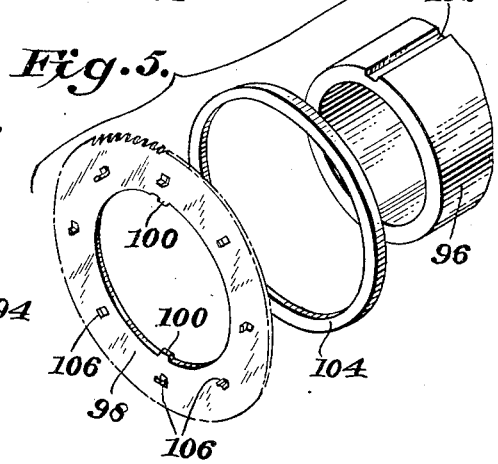
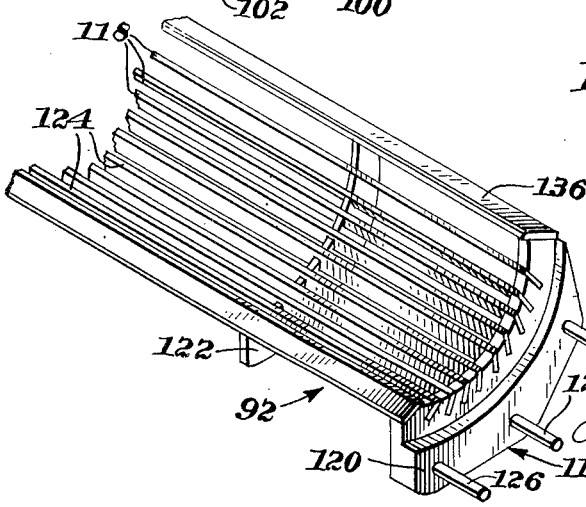
INVENTOR:
John H. Streun,
BY Cushman, Darby & Cushman
ATTORNEYS.

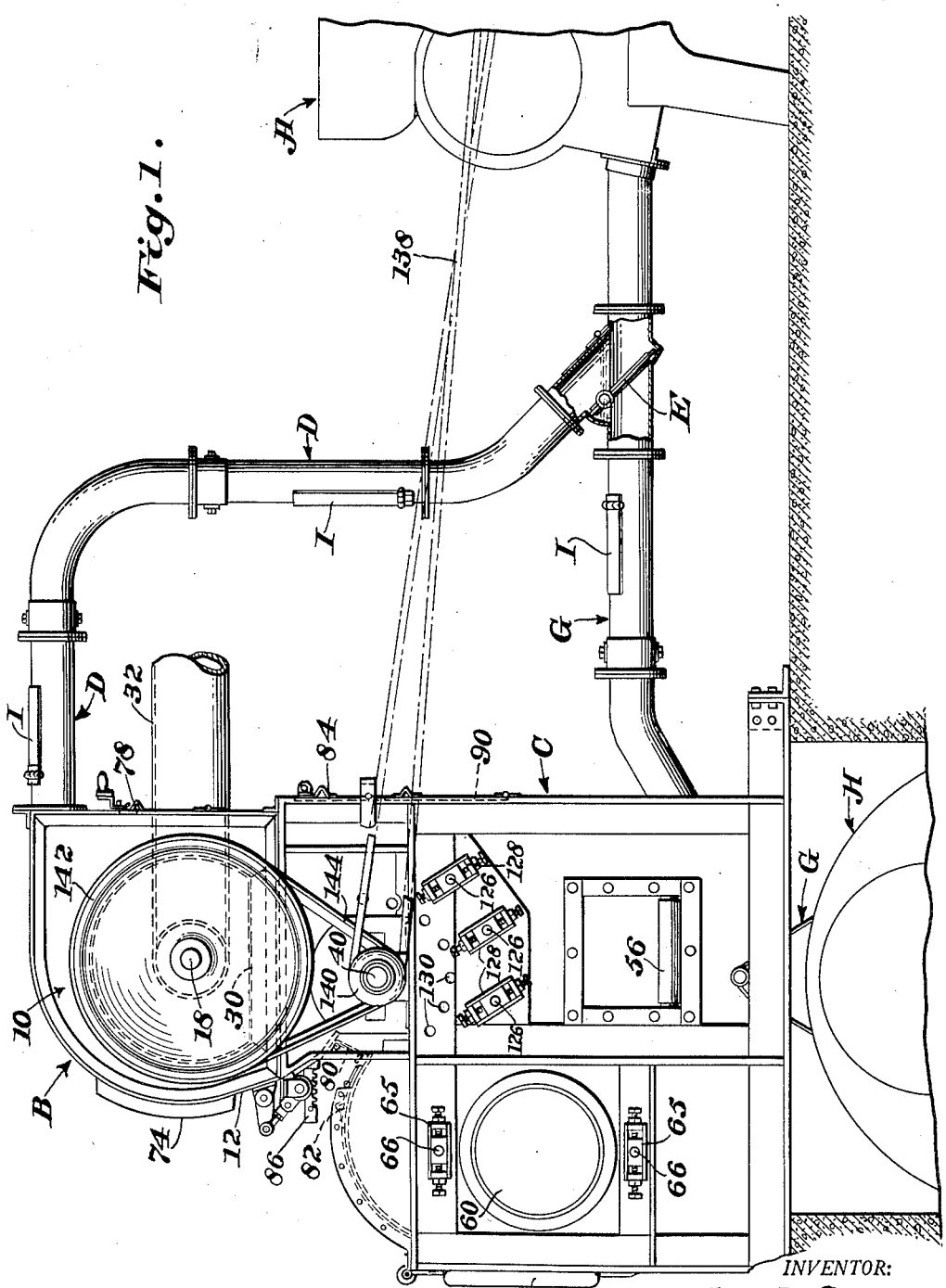

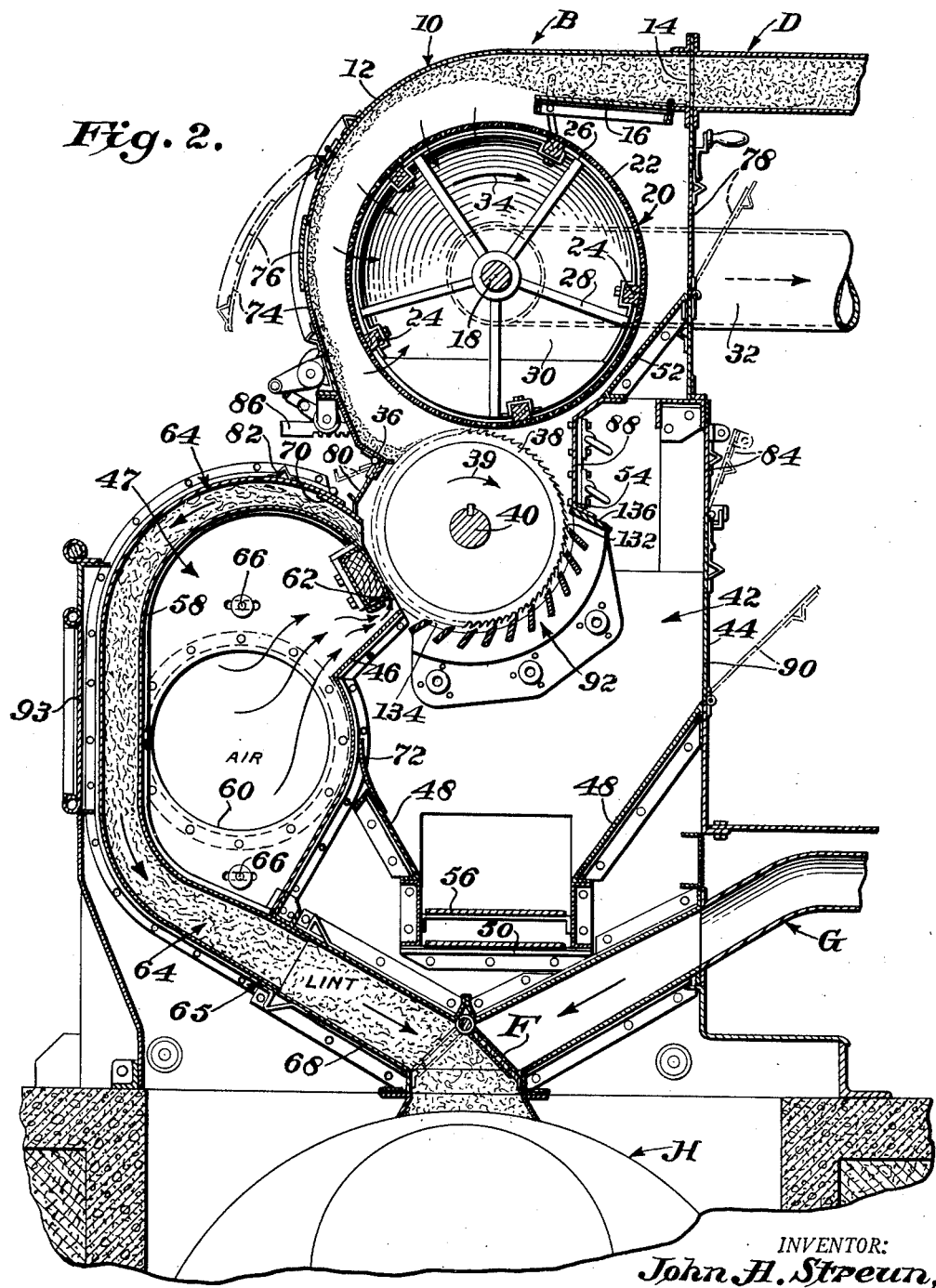

Patented May 26, 1953

2,639,468

UNITED STATES PATENT OFFICE 2,639,468

COTTON CLEANER

John A. Streun, Sherman, Tex., assignor to Hardwicke-Etter Company, Sherman, Tex., a corporation of Texas Application August 11, 1950, Serial No. 178,883

11 Claims. (Cl. 19—72)

The present invention relates to an air separator for lint cotton carried in an air stream and associated cleaning means for the cotton lint.

After cotton has passed through the conventional ginning machines it may still contain trash and motes which have not been removed by the ginning operation. This is particularly true of cotton which is picked later in the season as is well known in the art. Prior art methods for preventing this occurrence have included various means for cleaning the cotton prior to ginning. These methods have not been entirely satisfactory and it has been found desirable, therefore, to clean the cotton after ginning. This method of cleaning has been done in the past by removing the air from an air stream used for conveying the cotton to the additional cleaning machines by means of a condenser and then passing the cotton in the form of a batting onto a rotating cylindrical saw drum for the purpose of stripping trash, lint, and motes from it. This method also offers objections since the batted cotton when placed upon the saw cylinder will not release all of the trash and motes contained in it.

Therefore, this invention is particularly concerned with an improved air separating means which will not form a cotton batting but will supply a free flowing cotton lint to an improved cotton cleaning means for use after ginning. However, the apparatus of this invention may be used, if desired, at any stage during the processing of cotton including reclaiming of the same.

A principal object of this invention is to provide effective means for removing the air from a lint cotton air carrier stream and for passing the cotton in an unmatted condition directly onto an improved saw cylinder where the cotton is cleaned by an improved form of grid bars and is then removed by conventional means such as an air blast.

It is a further object of this invention to provide an air separator which is a foraminous rotating screen mounted in substantial contact with a rotating saw cylinder cotton cleaning means in order that any small amount of lumps or batted cotton that may be formed during ginning or separating may be broken up and distributed evenly across the saw cylinder thereby aiding in the cleaning action of the grid bars.

A further object of this invention is to provide an apparatus as aforesaid which is capable of either delivering the cotton lint in the air stream directly to a submerged lint flue for further delivery to a battery condenser and a press box for baling or for delivery of the lint cotton in the air stream to the air separating means and cleaning means and thence to the lint flue through the battery condenser and the press box for baling. This arrangement provides for an effective by-passing of the air separator and cleaning means if the condition of the lint cotton in the stream does not warrant the additional cleaning after ginning or some other operation.

Another object of this invention is to provide an adjustable grid bar member for association with the saw cylinder together with a leveling or preparing bar which provide a more effective beating or flailing action on the cotton as it is carried by the saw cylinder towards the lint removing means.

An additional object of this invention is to provide effective venting means and sealing means for controlling the air pressure between the air separating chamber and the saw cylinder cleaning chamber. In addition, an effective means is provided for conveying the motes and trash removed by the grid bars to a trash box or exhaust blower.

Still another object of this invention is to provide an adjustable means for controlling the pressure of the air delivered by an air jet or blasting means and used for removing the cleaned cotton lint from the rotating saw cylinder.

These and various other objects will become apparent from the following description taken in conjunction with the drawings wherein:

Figure 1 is a side elevational view of the air separator and lint cleaning means of this invention including the lint duct means for passing from a conventional cotton gin to either the submerged lint flue or the air removing and lint cleaning means of this invention;

Figure 2 is an enlarged central vertical sectional view showing the air separating and saw cylinder cleaning means of Figure 1;

Figure 3 is a longitudinal view partially in section of the saw cylinder arrangement preferred for use in this invention;

Figure 4 is a vertical cross-sectional view taken along the line 4—4 of Figure 3;

Figure 5 is an exploded view in perspective showing the arrangement of the saw blades and spacer means of the saw cylinder of Figure 3; and Figure 6 is a perspective view of one end of the adjustable grid bar arrangement of this invention.

Referring to Figure 1 there is shown a partial view of a ginning device A, which may be of any conventional type, associated with the air separator B and the cotton cleaning means C of this invention. Connecting the ginning device A and the air separator means B there is a lint and air stream conduit D. By-pass valves F and E (shown in Figure 2) may be changed as shown in phantom to direct the cotton through the duct G to the submerged lint flue H if desired instead of passing the cotton and air stream through the duct D to the air separator means B and thence to the cleaner C and down to the submerged lint flue H. The lint and air ducts D and G are provided with inspection doors such as I.

With reference to Figure 2, the air separator means B includes an outer casing indicated as 10 which has a forward downwardly curving wall 12. An inlet 14 from conduit D leading into the interior of casing 10 in a direction substantially tangential to the downwardly curving wall 12 is provided with an adjustable baffle 16 for additionally controlling the direction of flow of the cotton in the air stream and directing it against the inner surface of downwardly curing wall 12.

Mounted in the air separator chamber defined by the casing 10 by means of an axle 18 extending through the end walls of casing 10 is a cylindrical drum indicated as a whole at 20. The axle 18 of cylindrical drum 20 is positioned so as to permit the periphery of the drum to be removed from the downwardly curving wall 12 at its closest point a distance sufficient to allow free passage of the cotton without clogging or batting. The clearance required has been found to be several inches in actual practice.

The cylindrical drum 20 comprises a foraminous surface 22 supported by longitudinally extending members 24 which are carried on end rings 26 which in turn are supported by spokes 28. The foraminous surface 22 may be, for example, in the form of a wire mesh screen or may be a perforated metal sheeting. The ends of the drum 20 lie close to the end walls of casing 10 and may be sealed for preventing flow of air and cotton between the end walls and the ends of drum 20 by a semi-sharp knife edge on each of the rings 26 in substantial contact with the casing end walls. Extending from the end walls of the casing 10 and communicating with the interior of drum 20 are air exhaust headers indicated as 30 which are of a modified frustoconical shape. These headers are attached to exhaust ducts 32 which supply the suction necessary for conveying the lint cotton from the ginning machine A to the separator B.

From the above description it is apparent that as air is exhausted through ducts 32 cotton lint is entrained in the stream and transferred from the ginning stand into the interior of air separator casing 10 in a direction tangentially against the inner surface of the downwardly curving wall 12. The cylindrical drum 20 which is rotating preferably in the direction of the arrow 34 permits the passage of air therethrough and directly into ducts 32 while the separated cotton by centrifugal force is carried around and follows the wall 12 to its base where it is deflected by means of deflector 36 onto a saw cylinder 38 described hereinafter. The effective action of the separator means described is to permit the separation of the carrier stream of air and the cotton lint without occasioning objectionable matting or balling up of the cotton brought about by adherence of the cotton to screen 22 or clogging of the space between wall 12 and the periphery of drum 20 and then to deliver the separated cotton by gravity in an evenly distributed condition onto the rotating saw cylinder for cleaning.

Immediately below and within the air separator casing 10 is a saw cylinder cleaning means 38. This cleaning means 38, a preferred form of which is described more fully hereinafter in connection with Figures 3 through 5, has its axis of rotation in a substantially horizontal plane with its axis 40 extending through both end walls of the lower portion of casing 10 and supported thereby. The periphery of the saw cylinder 38 and the rotating drum 20 although not intersecting lie in substantial contact with each other with a preferred clearance of a fractional part of an inch. Furthermore, the periphery of saw cylinder 38 passes close to the end of the deflector 36 at the bottom of the downwardly curving wall 12. The preferred direction of rotation of the saw cylinder is clockwise as shown by arrow 39.

A mote and trash receiving chamber 42 is provided below the air separator casing 10 and is defined by a rearward vertical wall 44, a forward wall 46 which is the rear wall of an air supply chamber 47 described hereinafter, downwardly and inwardly extending walls 48, bottom wall 50, and upper wall 52 separating the separator chamber defined by casing 10 and chamber 42 and extending downwardly to a point 54 adjacent the periphery of the saw cylinder 38. Between the end 54 of the wall 52 and the upper end of the wall 46 there is provided a grid bar arrangement as described hereinafter for removing the motes and trash on the saw cylinder and depositing them into the chamber 42 for removal therefrom by means of a drag belt bottom conveyor 56 extending across the width of the chamber 42 and leading to a trash box or exhaust blower.

An air supply chamber 47 defined by rear wall 46 and walls 58 has an air blast supply pipe 60 fixed to at least one of its end walls. Air supplied by the pipe 60 into the supply chamber 47 is directed by means of nozzle or jet 62 tangentially against the periphery of the saw cylinder for removing the lint therefrom into a lint duct 64 by which it is carried into submerged lint flue H.

As shown in its preferred form, the air blast or nozzle 62 may have the width of its opening adjusted as desired by movement of the casing 64 supported on guide rods 66 in a direction from or towards the saw cylinder. This adjustability is possible by the telescoping communication 65 of lint duct 64 with submerged flue inlet duct 68 and telescoping member 70 which permits a lengthening or shortening of the upper end of duct 64, arcuate slots in the end walls of the casing permitting this movement which is adjusted by means such as 65. In order that this adjustability will not permit the passage of motes and trash between the wall 48 of chamber 42 and the wall 46, an adjustable seal such as 72 is provided.

The forward wall 12 of the chamber defined by casing 10 is provided with several inspection doors 74 which preferably have a window 76.

In addition, a door 78 which is of the quick locking type permitting the door to be opened quickly for the purpose of inspection of the rear portion of the same chamber is also provided.

Doors 80 and 82 on the forward portion of the apparatus adjacent the saw cylinder 38 are for the purpose of inspecting and examining the saw teeth and are sealed with felt to prevent air leakage. In addition, door 84 hinged at its bottom is provided for operating by means of bar 86 from the forward portion of the machine in order to obtain the proper venting for chamber 42. Within the chamber 42 accessible through door 84 is another door 88 with hook fasteners for holding the same in a closed position and serving for an entrance to permit cleaning out of the small chamber directly above the saw cylinder 38 and under the venting cylinder 20. Door 90 is provided for the purpose of permitting inspection of the grid bars 92 described hereinafter as well as inspection of drag belt 56. Door 93 permits inspection of lint flue 64.

Figures 3 through 5 show the preferred form of the saw cylinder 38 which is carried by shaft 40. Hub flanges 94 keyed to shaft 40 carry an annular saw disc supporting means 96. Carried by the saw disc support 96 are a plurality of spaced saw discs 98 each saw disc being keyed by means of keys 100 projecting therefrom in the keyways 102 of the member 96. Between each of the saw discs 98 is a spacer ring 104 which is supported on spacer ring carrying teats 106 projecting from the sides of saw discs 98. On each end of the cylindrical saw disc support 96 is provided a wedge-shaped ring member 108 which is locked to the cylindrical saw disc support 96 by means of keys 110 extending into keyways 102. The positioning of wedge-shaped members 108 as shown causes the parallel planes of the saw discs 108 to lie slightly inclined to the normal of the axis of axle 40. They are locked in this position rigidly by means of locking nuts 112 received by screw threaded means 114 on each end of the cylindrical saw disc support 96. The angulation of the saw disc blades to the normal of the axis of axle 40 permits a wobbling effect of the saw blades as the cylindrical saw member 38 is rotated. This effect described hereinafter during the description of the operation of the apparatus of this invention aids materially in a thorough removing of the trash and lint found in the cotton.

A plurality of clearing pins 115 are provided about the periphery of locking nuts 112 to serve for the purpose of keeping the space between the end walls of the casing 10 and the first saw disc cleaned out. Accumulation of cotton in this space can be the cause of a frictional fire and is, of course, an important hazard to eliminate.

As shown in Figure 6, an improved form of grid bar arrangement indicated as a whole at 116 is provided for use in connection with the lint cleaning saw cylinder means 38. The grid bar arrangement 116 in its preferred form consists of a plurality of grid bars 118 carried in spaced relationship to one another by crescent-shaped end supporting means 120 and prevented from twisting along their length by a plurality of additional spacer means such as 122. Each of the grid bars 118 has semi-sharp knife edges 124 which lie nearly tangential to the periphery of the cylindrical saw cleaning means 38 but whose body member extends outwardly at an angle to the normal of a tangent to the periphery of the cleaning means 38 so as to permit the trash and motes to be guided between adjacent grid bars at substantially the same aforesaid angle.

The improved grid bar arrangement of this invention is supported by the end walls of trash and mote receiving chamber 42 by means of three rods 126 extending through arcuate slots in the same. Adjusting means 128 as shown permit the position of the grid bar arrangement 116 to be adjusted to the periphery of the cylindrical saw cleaning means 38. The required adjustment may be determined by a feeler gauge inserted through a plurality of holes 130 leading to the space between the periphery of the saw cylinder cleaning means 38 and the knife edges 124 of the grid bars 118. This adjustment is of importance since it provides an accurate means for positioning the grid bar arrangement 116 with reference to the periphery of saw cylinder 38 so as to produce the optimum amount of flailing or beating action upon the cotton lint as it passes through the area of the mote and trash removing grid bars 116. It is desirable that the spacing at point 132 be somewhat greater for example than the space at point 134. It is found that by this adjustment a more effective action of the grid bar results. The adjusting means as described above permits this adjustability. Leveling bar 136 whose purpose is described hereinafter is desirably carried by the grid bar arrangement 116 but may, if desired, be carried by the end 54 of wall 52.

As shown in Figure 1, a preferred form of driving means for the cylindrical saw cleaning means 38 and the air separator 20 comprises a take-off endless belt drive 138 from ginning device A leading to a double pulley drive member 140 fixed to the end of shaft 40. At the extremity of shaft 18 extending through the exhaust conduit 30 and in line with drive pulley means 140 is a second drive pulley 142. An endless belt means 144 connects double pulley drive means 140 and 142 for rotating cylindrical air exhaust means 20. In practice, it has been found that a speed of 800 to 1000 R. P. M. is desirable for the saw cylinder cleaning means 38, there being a ratio of approximately 6 to 1 between the speed of cleaning means 38 and air exhaust means 20. Other arrangements may, of course, be used for driving shafts 18 and 40 including separate means for each.

The sequence of operation of the above-described apparatus when it is desirable to pass the lint cotton through the air exhaust means and additional cleaning means is as follows: The lint cotton suspended in the air stream is passed from the ginning apparatus through duct D and through entrance 14 into the air separator within the chamber defined by casing 10 at which time it is moving tangentially to the downwardly curving wall 12. This directional movement is insured by means of baffle 16 which is adjustable. The cotton lint passes downwardly following the wall 12 and is deflected by deflector 30 onto the peripheral surface of the saw cylinder cleaning means 38. Air which had entrained this separated cotton is removed from the chamber defined by casing 10 by passing through the foraminous surface of drum 20 which is rotating in a clockwise direction. Because of the deflecting action of baffle 16 and the spacing between the periphery of the drum 20 and the inner side of wall 12 there is no matting or balling of the lint cotton. Further, it does not adhere to the screen surface of the drum 20.

The lint cotton as it is deflected onto the saw cylinder 38 which is rotating in a clockwise direction is caused to wobble somewhat because of the construction of the preferred form of the saw cylinder cleaning means. This wobbling effect along with the action of the rotating cylindrical air separating means whose periphery passes close to the saw cylinder periphery causes an even distribution of the cotton over the surface of the saw cylinder 38 and aids in breaking up any small matted portions of cotton passing thereunder.

The cotton is carried from this position around to leveling bar or preparatory bar 136. This bar reduces the entrance of the cotton and further aids in distribution of the same over the surface of cylinder 38. The cotton next passes through the grid bar cleaning means where, because of the centrifugal force, the cotton is held out in a position permitting a flailing or beating action of the grid bars. This flailing or beating action removes trash and motes and deposits them into chamber 42 from whence they are conveyed by drag belt or endless belt means 56 to a trash box or exhaust means. The cotton, after leaving the region of the grid bars, is removed from the saw cylinder by means of air jet or blast means 62 which as previously described is adjustable. The pitch of the teeth with their rounded throats as shown permits easy removal of the cotton by this exhaust means and the cotton is then directed to lint duct 64 by which it is conveyed to lint flue H for condensing and baling.

From the above description of the air separator for lint cotton carried in an air stream and the associated cleaning means for the same taken along with the description of their operation, it is apparent that the air separator effectively separates the cotton from the cotton laden air stream and passes it to its associated cleaning means without matting or balling up the cotton in which condition separation of motes and trash therefrom would be difficult. In addition, the air separator means aids materially in distributing the cotton lint over the cylindrical surface of the saw disc and its close association prevents the passage of air down into the trash and mote receiving chamber. Further, the novel feature of the provision of a leveling bar for further aiding in the correct distribution and location of the cotton over the cylindrical saw surface assures that the action of the grid bars will be effective.

The adjustable feature of the grid bars is of importance since it permits the allocation of the same with respect to the cylindrical saw surface in an accurate manner which makes for a most efficient action.

The adjustable feature of the air blast or jet nozzle for removing the cotton lint after it has been processed on the saw cleaning cylinder further aids in that correct adjustment will prevent cotton from passing through its cycle of conditioning and cleaning operations on the cylindrical saw drum more than once.

The structure described which surrounds the saw cylinder cleaning means 38 and separates the air exhausting chamber defined by casing 10 and the mote and trash removing chamber 42, namely the deflector means 36, the leveling bar 136 and wall 52 aid in the distribution of the cotton, as described previously, but do not permit an appreciable draft to pass between the saw cylinder and their ends because of the close proximity of the same to the periphery of the saw cylinder 38. However, the space between the individual saw discs 98 and above the spacer means 104 permits a draft to pass through it which aids in distributing the cotton on the rapidly rotating saw cylinder 39. Control of this draft is brought about by the position of door 84. The necessary opening of the door 84 for the most efficient action of the apparatus has been found to be of the order of several inches.

The above description of the apparatus including the illustration in the drawings is not limiting to the scope of this invention which is set forth in the claims wherein I claim:

1. A separator for cotton lint carried in an air stream and associated cleaning means for said separated cotton lint comprising a casing having an inlet adapted to deliver the cotton tangentially against the upper portion of an inner surface of a downwardly curving wall of said casing, a foraminous cylinder mounted for rotation in said casing and having its axis of rotation in a substantially horizontal plane, the periphery of said cylinder being spaced from said downwardly curved wall, means associated with the ends of said rotating foraminous cylinder for exhausting the carrier air stream through the walls of said cylinder, a saw cylinder mounted for rotation in a substantially horizontal plane, said saw cylinder being located at the lower end of said downwardly curving wall so as to receive separated cotton thereon and having its periphery spaced from but in substantial contact with the periphery of said foraminous cylinder, trash and mote removing means associated with said saw cylinder, and means for removing said cotton from said saw cylinder after removal of trash and motes therefrom.

2. A separator for cotton lint carried in an air stream and associated cleaning means for said separated cotton lint as set forth in claim 1 wherein said means associated with said rotating foraminous cylinder for exhausting air from said casing through the walls of said rotating foraminous cylinder and outwardly from the ends thereof comprises an air exhaust duct communicating through a wall of said casing with the open end of said cylinder and sealing means carried by the ends of said rotating foraminous cylinder and cooperating with the adjacent walls of said casing for preventing by-passage of said foraminous cylinder.

3. A separator for cotton lint carried in an air stream and associated cleaning means for said separated cotton lint as set forth in claim 1 wherein a deflector is provided at the lower end of said downwardly curving wall for aiding in the distribution of said separated cotton lint on said saw cylinder.

4. A separator for cotton lint carried in an air stream and associated cleaning means for said separated cotton lint as set forth in claim 1 wherein a leveling bar closely associated with the periphery of said saw cylinder is provided for reducing the entrance of the cotton into the associated trash and mote removing means.

5. A separator for cotton lint carried in an air stream and associated cleaning means for said separated cotton lint as set forth in claim 1 wherein said trash and mote removing means associated with said saw cylinder comprises an adjustable grid bar means having at its entrance end a leveling bar for reducing the entrance of the cotton.

6. A separator for cotton lint carried in an air stream and associated cleaning means for said separated cotton lint as set forth in claim 1 wherein said means for removing said cotton from said saw cylinder after removal of trash and motes therefrom comprises an air jet means having an adjustable throat.

7. A separator for cotton lint carried in an air stream and associated cleaning means for said separated cotton lint as set forth in claim 1 wherein a plurality of clearing pins are provided on the periphery of the saw cylinder at the ends thereof for preventing the passage of cotton between the ends of the saw cylinder and the adjacent walls of said casing.

8. A separator for cotton lint carried in an air stream and associated cleaning means for said separated cotton lint comprising a casing having an inlet adapted to deliver the cotton tangentially against the upper portion of an inner surface of a downwardly curving wall of said casing, a foraminous cylinder mounted for rotation in said casing and having its axis of rotation in a substantially horizontal plane, the periphery of said cylinder being spaced from said downwardly curved wall, means associated with the ends of said rotating foraminous cylinder for exhausting the carrier air stream through the walls of said cylinder, a saw cylinder mounted for rotation in a substantially horizontal plane, said saw cylinder being located at the lower end of said downwardly curving wall so as to receive separated cotton thereon, said saw cylinder comprising a plurality of spaced apart saw discs in parallel planes at an angle to the normal of the axis of rotation and having its periphery spaced from but in substantial contact with the periphery of said foraminous cylinder, trash and mote removing means associated with said saw cylinder, and means for removing said cotton from said saw cylinder after removal of trash and motes therefrom.

9. A separator for cotton lint carried in an air stream and associated cleaning means for said separated cotton lint as set forth in claim 8 wherein a leveling bar closely associated with the periphery of said saw cylinder is provided for reducing the entrance of the cotton into the associated trash and mote removing means.

10. A separator for cotton lint carried in an air stream and associated cleaning means for said separated cotton lint as set forth in claim 8 wherein said saw cylinder comprising a plurality of spaced apart saw discs in parallel planes at an angle to the normal of the axis of rotation includes spacer rings between each adjacent pair of saw discs which permit air drafts between adjacent pairs of saw discs and above their spacer rings for distributing the cotton on the said rapidly rotating saw cylinder.

11. A separator for cotton lint carried in an air stream and associated cleaning means for said separated cotton lint as set forth in claim 8 wherein a deflector is provided at the lower end of said downwardly curving wall for aiding in the distribution of said separated cotton lint on said saw cylinder.

JOHN A. STREUN.

References Cited in the file of this patent

UNITED STATES PATENTS

| Number | Name | Date |
|---|---|---|
| Re. 23,044 | Brooks | Oct. 19, 1948 |
| 644,974 | Frost | Mar. 6, 1900 |
| 1,581,363 | Streun | Apr. 20, 1926 |
| 1,946,784 | Elliott | Feb. 13, 1934 |
| 1,975,335 | Smith | Oct. 2, 1934 |
| 2,009,928 | Henry | July 30, 1935 |